United States Patent [19]

Hardt et al.

[11] Patent Number: 5,083,041

[45] Date of Patent: Jan. 21, 1992

[54] THERMOMAGNETIC SAFE ARM DEVICE

[75] Inventors: Lee R. Hardt; James E. Means, both of Ridgecrest, Calif.

[73] Assignee: The United States of America as represented by the Secretary of the Navy, Washington, D.C.

[21] Appl. No.: 461,564

[22] Filed: Jan. 5, 1990

[51] Int. Cl.$^5$ .............................. H02K 1/02
[52] U.S. Cl. ........................ 290/52; 290/1 R
[58] Field of Search ....................... 290/1 R, 52

[56] References Cited
PUBLICATIONS

Sears, Femansky & Young; College Physics; 1985; pp. 622-623.
Burke; Handbook of Magnetic Phenomena; 1986; pp. 46-47, 53-54 & 57.
McGraw-Hill Encyclopedia of Science & Technology; 1987; pp. 629-631.

Primary Examiner—J. R. Scott
Assistant Examiner—Robert L. Hoover
Attorney, Agent, or Firm—Harvey A. Gilbert; Melvin J. Sliwka; Sol Sheinbein

[57] ABSTRACT

A safe and arm device with a thermomagnetic generator sharing a tubular shaped shaft with a turbine. Weapon propellant exhaust gas enters the shaft and heats thermomagnets in the generator causing their magnetism to be produced and flux lines to flow from rotor to stator. The gas moves translationally through the shaft and into the turbine. The gas leaving the turbine rotationally is discharged into a radial exhaust tube. A plug in the tube must be removed to permit gas exhaust from the turbine. Only then can the turbine and connected generator rotate causing the thermomagnetically produced flux lines of the rotor to be cut by the stator resulting in an induced voltage out of the generator.

18 Claims, 1 Drawing Sheet

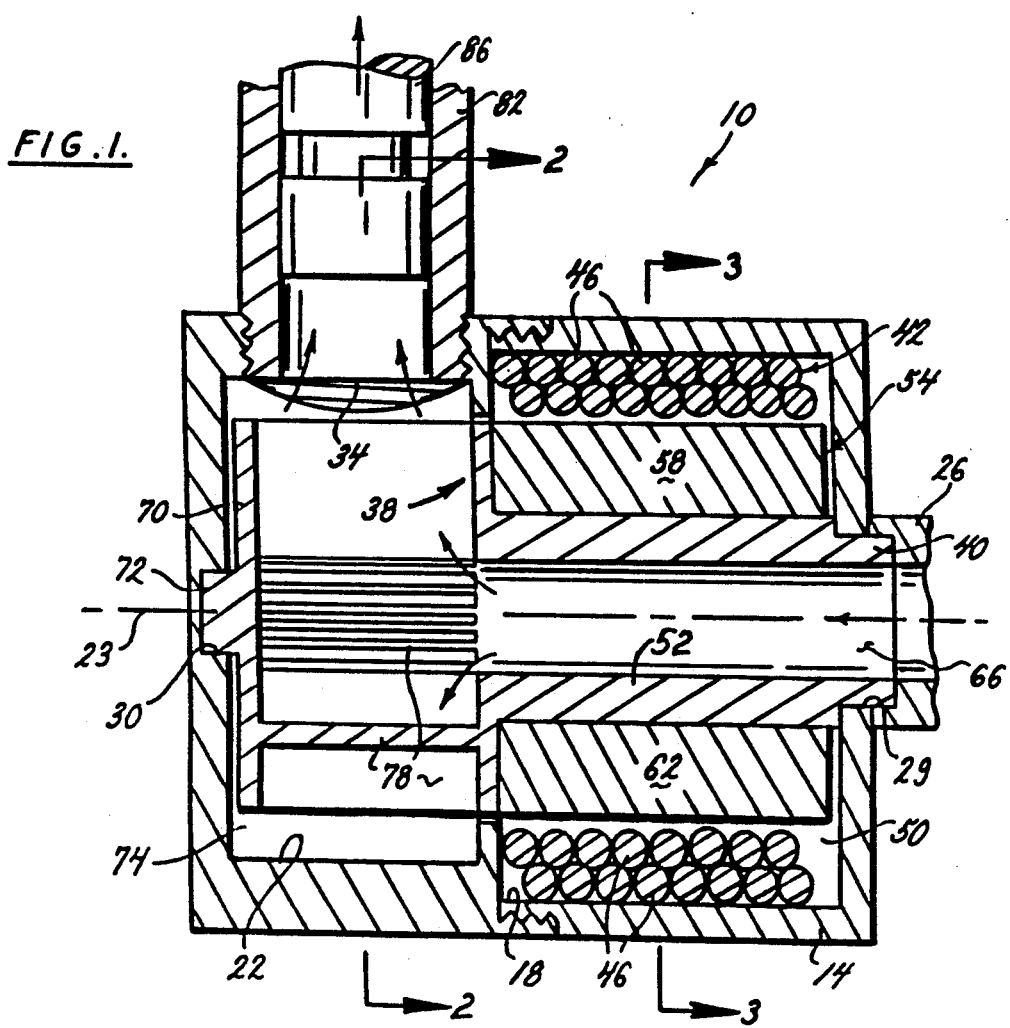
FIG. 1.
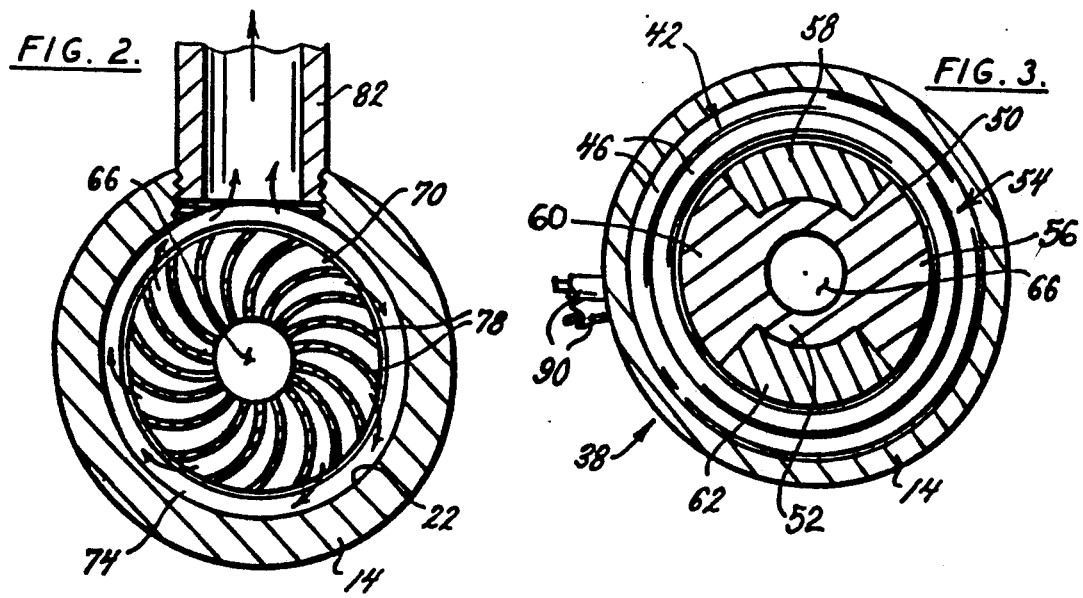
FIG. 2.
FIG. 3.

THERMOMAGNETIC SAFE ARM DEVICE

BACKGROUND OF THE INVENTION

1. Field of the Invention

The present invention relates to the field of safe and arming of dangerous explosive devices. In particular, the present invention relates to safe and arming of weapons and ordnance devices.

There are a variety of applications for safe and arming devices that are dangerous by their very nature. This is particularly true where explosives are employed. Thus, in a non-military application where an explosive charge is being used in, for example, an oil field operation there are situations where it is desirable to have a safe and arm device associated with the explosives in order to protect the users and provide a degree of safety which is necessary during the course of placing the explosive for the particular application. Likewise, there are obviously numerous military applications involving explosive ordnance which require and demand the use of a safe and arming device. This is particularly true in situations where ordnance is aircraft delivered. In such situations, it is highly desirable that the ordnance be released from the aircraft and that arming not take place until after that ordnance has cleared the flight path and is not any longer in close proximity to the aircraft. The safe and arm device should, of course, keep the ordnance in a safe condition from the time it is assembled as a complete system at the manufacturing site until after it is launched from the aircraft or other launch vehicle. That is, it is obviously important that the ordnance or weapon system not be able to accidentally or otherwise be put into an operational condition during the shipping, handling, storage and other prelaunch environment situations.

One approach to safe and arming an ordnance device is to have the elements or components in the explosive train positioned so that the train is interrupted prior to the time the device is to be armed. In such a system when the ordnance device is being prepared for use, all of the elements of the explosive train are misaligned and maintained out of position until a manual or automatic sequence of events typically triggered by a post-launch event occur. This triggering like the sequence of events may be manual or automatic. With a misaligned explosive train the intent is obviously to see to it that a number of events are required to take place before alignment occurs and full access to the primary warhead explosive can result. Alignment may be accomplished electrically, mechanically, or electro-mechanically and arming may additionally require electronically controlled events to occur and signals to be present at specific times in the re-alignment sequence. It is only when all of the components or elements of the safe arm system and the components in the explosive train preceding the warhead explosive are placed in the proper alignment and all appropriate signals are received in combination and in the proper sequence that the warhead can be detonated.

In an earlier type of safe and arm system, barriers were introduced into the electrical, mechanical, electro-mechanical or electronic chain of events preceding the actual arming act such that unless all barriers were removed in the proper sequence the primary explosive, that is, the warhead could not be detonated. The complication of a multitude of barriers with one or more types or combination of types of schemes for moving such barriers resulted in many situations where the ordnance device became a dud and was unable to be fired. A single failure in the chain resulted in a totally inoperative ordnance device. Also, the more complicated the chain, the less likely pre-use troubleshooting and recovery would be successful. Thus, it is important that whatever scheme is used for safe and arming purposes, whether requiring realignment of misaligned components or removal of prepositioned barriers, the chain or sequence of events, used to bring components into alignment or to remove barriers must be such that the arming chain of events that will permit the primary explosive to be detonated can safely and reliably occur at the exact time required and not before. In considering the types of safe and arm devices it is important also to consider device reliability. It is particularly important in situations involving aircraft-launched ordnance that crew safety be assured. The safe and arm device must, therefore, be simple and reliable so that the crew is not put in an unsafe situation where a weapon can be unintentionally armed prior to release from the launch aircraft. Also it is important that the weapon upon launch and delivery not be a dud. Obviously the weapon should be in a safe condition during all prelaunch and preflight handling and storing operations.

2. Description of the Prior Art

Two types of prior art systems that take advantage of alignment and sequencing are the in-line systems and out-of-line systems. In the in-line systems electrical power comes from a missile thermal battery, for example, and a series of sensors then verify that the missile is following the desired post launch sequence. In an out-of-line system hot gases from weapon propellant exhaust pushes against a piston which then arms the fuze mechanically. Electrical power to complete the arming function comes from the missile thermal battery.

Mechanical safe and arm devices of the prior art have typically suffered from the types of problems one would expect from most mechanical systems. That is, there are typically a number of failure modes that are directly related to the number and types of interrupting elements or components within the mechanical system that must be actuated to make the mechanical device work properly. Thus it has been found not to be true that the more mechanical interruptions or barriers that are placed in the safe arm chain to the primary explosive the safer the device. If the intent is to make the device safe by having a more complex mechanical safe and arm implementation, one may find that although the safe and arm device fails in the safe mode, the weapon system or ordnance that was delivered in effect has become a dud. This may result in the delivering aircraft and flight crew being subjected to operating and environment hazards because of the weapon failure.

Many of the current safe and arm devices are tending to use purely electronic devices for the safe and arming function and any time delays that are required in relation to such functions. Time delays in the safe and arm systems that are primarily mechanical or electro-mechanical are typically more difficult to control than are those obtained by means which are purely electronic in nature. Electronic safe and arm devices including electronic time delay capabilities are, however, not without their faults. Power failures and device failures may result in a total loss of output of the device or of its time delay feature. Another failure mode involves a runaway condition in the electronic device or circuit. Some types of electrical devices or electronic devices are subject to outside interference. Thus in the use of such devices one must be concerned that the ordnance or weapon to which such a safe and arm device is attached may be triggered prematurely during preflight or prelaunch operations. What is in fact needed is a very simple device whether it be electrical, electro-mechanical, or electronic that provides a greater assurance of its operative condition and which does not have a failure mode which is totally detrimental to the mission in which the ordnance item is required.

SUMMARY OF THE INVENTION OBJECTS

Thus, it is an object of the present invention to provide a safe-arm device the function of which is dependent on the availability of post-launch weapon propellant exhaust gas.

It is another object of the present invention to provide a safe-arm device which cannot become operative until weapon propellant exhaust gas is produced.

It is still another object of the present invention to provide a safe-arm device which cannot be made operative until manual enablement and receipt of weapon propellant exhaust gas.

It is yet another object of the present invention to provide an electrical output only when enabled manually and in receipt of heated weapon propellant exhaust gas.

It is another object of the present invention to provide electrical output from a thermomagnetic source supplied with weapon exhaust gases when manually enabled.

It is further another object of the present invention to provide a safe and arm device with a time delay after manual enablement and weapon launch until activation and output that is dependent upon post launch weapon exhaust gas temperature effect and on the size and type of thermomagnets employed in the device for electrical signal generation.

The present invention can be used to simplify the entire safe and arm process used in virtually any kind of dangerous arming situation whether it be a military or non-military application. Specifically the present invention does not require an external power supply to electrically activate or be used for operating the remainder of the detonator circuitry connected to the primary ordnance or warhead of the device. Further, the present invention cannot be made operative without manual initiation and post-flight release of the device where used in an airborne application. The present invention requires that propellant exhaust gas from an airborne weapon or an alternative exhaust gas from some source in-a non-airborne application be made available after manual or automatic actuation of the device, in order to make the device entirely operative. Thus without the manual actuation and the subsequent flow of exhaust gas through the device of the present invention, it cannot be made operative to further activate any other elements in the explosive chain prior to the primary explosive.

BRIEF DESCRIPTION OF THE DRAWINGS

Other objects, advantages, and features of the present invention will be apparent from the following detailed description when considered in conjunction with the accompanying drawings in which:

FIG. 1 is a side sectional view of the safe-arm device of the present invention.

FIG. 2 is a sectional view of the safe-arm device taken along line 2—2 in FIG. 1.

FIG. 3 is a sectional view of the safe arm-device taken along line 3—3 of FIG. 1.

DETAILED DESCRIPTION OF THE INVENTION

With reference to FIG. 1 the safe and arm device 10 of the present invention is shown contained within the housing 14. The housing 14 contains the first cylindrical cavity 18 and the adjoining second cylindrical cavity 22. The first cylindrical cavity 18 and second cylindrical cavity 22 share the same centrally located longitudinal axis 23 extending through the safe and arm device 10. The supply pipe 26 which brings exhaust gas, as from a burning propellant source to the device 10 is affixed to the housing 14 at the first cylindrical cavity 18 end of the housing 14. The radial port 34 extends radially outward from the second cylindrical cavity 22 and is shown in FIGS. 1 and 2 threaded therein.

The first cylindrical cavity 18 contains the generator 38 of the safe and arm device 10. The passageway 66 extends axially through the housing 14 from within the hub 40 journaled at 29 at the first cylindrical cavity 18 end of the housing 14 to the hub 72 journaled at 30 at the second cylindrical cavity 22 end of the housing 14. The generator 38, shown in FIGS. 1 and 3, within the housing 14 contains the stator 42 which consists of the windings 46 extending annularly about the inner periphery of the housing 14, the airgap 50, and the rotor 54 on the opposite side of the airgap 50 from the windings 46. The rotor 54 within the first cylindrical cavity end of the housing 14 is affixed to or an integral part of the turbine 70 located within the second cylindrical cavity 22. The rotor 54 of the generator 38 has a central tubular shaft 52, a pair of permanent magnets 56, 60 mounted at diametrically opposite sides of the shaft 52, and a pair of thermomagnets 58, 62 mounted at diametrically opposite sides of the shaft 52 and between the permanent magnets 55, 56 of a suitable ferromagnetic material. The entry tube 66 extends through the first cylindrical cavity 18, and through the second cylindrical cavity 22, between the hub 40 and hub 72, respectively.

The passageway 66 extends into the second cylindrical cavity 22 end of the housing 14 through the turbine 70. The turbine 70 consists of the turbine blades 78 extending spirally and radially outward from the passageway 66 within the second cylindrical cavity 22 of the housing 14. The turbine 70 is separated from the inside walls of the housing 14 within the second cylindrical cavity 22 end of the housing 14 by the airgap 74.

As may be seen in FIGS. 1 & 2 the exhaust tube 82 extends radially out from the second cylindrical cavity 22 end of the housing 14. The exhaust tube 82 may be snug fit, molded as an integral part of, or threaded into the housing 14, as shown in FIGS. 1 & 2. The exhaust tube 82 is thus positioned to receive the exhaust gases translationally transiting the entry tube 66 and exiting from the turbine 70 after acting upon the turbine blades 78 and being converted into rotational flow. Gas flow essential to heating generator 38 and rotating turbine 70 and connected generator 38 cannot occur unless the gas is permitted to exit through the exhaust tube 82 when the plug 86 is removed. FIG. 3 shows output wires 90 which are extensions of the windings 46 from the thermomagnetic generator 38.

OPERATION

The operation of the safe and arm device 10 may be readily understood with reference to FIGS. 1, 2, & 3. Prior to use and in particular prior to launch from an aircraft in flight the safe and arm device 10 must be enabled. This is required to prepare the arming system for a weapon launched from an aircraft. To enable the safe and arm device 10 the plug 86 must be removed from the exhaust tube 82. Removal may be manual or mechanically performed. This opens the gas flow path from the supply pipe 26 through the passageway 66, through the generator 38 and the turbine 70, and out the exhaust tube 88 in order to permit operation of the safe and arm device. If the plug 86 is left in the exhaust tube 82, that path is closed and gas introduced into the safe and arm device 10 cannot flow and cause it to operate.

Once the plug 86 is removed from the exhaust tube 82 gas can be introduced from the supply pipe 26 into the passageway 66 at the first cylindrical cavity 18 end of the housing 14. The gas will then transit translationally from the supply pipe 26, through the passageway 66, and into the second cylindrical cavity 22 by way of the turbine 70. As the gas enters the turbine 70 it will be radially converted from its translational entry course into rotational flow exiting the turbine 70 and continue out as somewhat turbulent and then translational flow through the exhaust tube 82. The gas causes the turbine 70 to turn by virtue of its action on the turbine blades 78. Once the turbine 70 begins turning the generator 38 to which it is joined and with which it shares the passageway 66 likewise begins to rotate. During the initial period of gas transit through the passageway 66 heat is transferred from the gas to the rotor 54 between the permanent magnets 56, 68 through the central tubular sleeve 52 to the first thermomagnet 58 and the diametrically opposed second thermomagnet 62, both of which are embedded in the rotor 54, causing an increase in their temperature. As the temperature increases, the thermomagnets 58 and 62, being composed of a suitable antiferromagnetic material whose magnetic susceptibility increases with temperature below the Neel's temperature of the material, become more magnetic. That is, they exhibit increased magnetic properties and produce more magnetic flux. The lines of magnetic flux created by the permanent magnets 56, 60 and the heated thermomagnets 58 and 62 are cut by the windings 46 in the stator 42, as the rotor 54 rotates therein. This produces the induced voltage in the windings 46 which becomes the electrical output of the safe and arm device 10.

The time delay resulting from the time required for the heat of the gas to be transferred to the rotor 54 and therefrom to the embedded thermomagnets 58 and 62, and until they reach the temperature at which they produce the desired level of magnetic flux results in a delayed electrical output from the safe and arm device 10 at the output wires 90 shown in FIG. 3. Thus, the thermomagnets 58 and 62 can be selected to have a quick response time or any desired response time for a particular application. They can be selected so that they begin producing magnetic flux at lower temperatures and thus, more quickly, or at higher temperatures and more slowly. Various response times are possible depending upon the materials from which the thermomagnets 58 and 62 are fabricated, their size, and the rotor material with which they are in contact. To obtain the desired time delay or device response time these factors must be determined in consideration of the temperature of the particular gas providing the heat and propulsive energy to the safe and arm device 10.

It should be obvious that many modifications and variations of the present invention are possible as indicated in the above description of the invention. It should, therefore, be understood that within the scope of the following claims the invention may be practiced in other ways than as specifically described.

What I now claim as my invention is

1. A safe and arm device, comprising:

A means for receiving a gas flow transiting into and therethrough, for capturing and converting the thermal energy of said gas to a voltage, and for discharging said gas; and a means for controlling gas transit and exhaust from said device, said means for controlling juxtaposed in operational association with said means for receiving, capturing, converting, and discharging.

2. The safe and arm device of claim 1 wherein said means for receiving, capturing, converting and discharging is thermomagnetic.

3. The safe and arm device of claim 2 wherein said means for receiving, capturing, converting and discharging axially receives said gas flow.

4. The safe and arm device of claim 3 wherein said axially received gas flow is translational.

5. The safe and arm device of claim 4 wherein said means for receiving, capturing, converting and discharging said gas flow is adapted to receive and permit the central transit of said gas flow therethrough.

6. The safe and arm device of claim 5 wherein said means for receiving, capturing, converting and discharging is adapted for radially discharging said translationally received gas.

7. The safe and arm device of claim 6 wherein said means for receiving, capturing, converting and discharging comprises a thermomagnetic electric generator in operative association with axially disposed turbine and a tubular shaft extending through, as the rotational axis of each, one end extending through said generator disposed to receive said translational gas, and the opposite end extending through said turbine and disposed to receive said translational gas passing from the shaft end in said generator and discharge said gas radially into said turbine.

8. The safe and arm device of claim 7 wherein said means for controlling transit and exhaust from said device comprises:

an exhaust tube radially extending in operative association with said turbine; and a plug, movably disposed in said exhaust tube.

9. The safe and arm device of claim 8 wherein said gas is a weapon propellant exhaust.

10. A safe and arm device, comprising:

a thermomagnetic means for receiving a gas flow transiting there through and for capturing and converting the thermal energy of said gas to a voltage;

a means for converting said gas flow to rotational flow, said means being disposed in operative association with said means for receiving said gas flow and capturing and converting the thermal energy of said gas to a voltage; and a means for controlling the exit of gas from said safe and arm device, said means disposed radially adjacent and affixed to said means for converting said gas flow to rotational flow.

11. The safe and arm device of claim 10 wherein said gas flow received is translational flow.

12. The safe and arm device of claim 11 wherein said translational gas flow is received axially by said means for receiving, capturing and converting.

13. The safe and arm device of claim 12 wherein said means for controlling the exit of said gas comprises a means for retaining and releasing said gas from said device.

14. The safe and arm device of claim 13 wherein said means for retaining and releasing said gas comprises:
   an exhaust tube radially extending in operative association with said turbine; and
   a plug, movably disposed in said exhaust tube.

15. The safe and arm device of claim 14 wherein said means for axially receiving a translational gas flow transiting therethrough and for capturing and converting the thermal energy of said gas to a voltage comprises a thermomagnetic generator having a tubular-shaped shaft extending axially therethrough.

16. The safe and arm device of claim 15 wherein said thermomagnetic generator comprises:
   a stator,
   a rotor operatively disposed in and coaxial with said stator and adapted to receive said translational gas flow transiting therethrough;
   a pair of permanent magnets diametrically disposed opposite one another in said rotor; and
   a pair of thermomagnets diametrically disposed opposite one another and between said permanent magnets in said rotor.

17. The safe and arm device of claim 16 wherein said means for converting said axially received translational gas flow to rotational flow is a turbine.

18. The safe and arm device of claim 17 wherein said gas is a weapon propellant exhaust.

* * * * *